(12) United States Patent
Huang

(10) Patent No.: US 12,302,890 B2
(45) Date of Patent: May 20, 2025

(54) REUSABLE NON-LETHAL INSECT TRAP

(71) Applicant: Justin Huang, Irvine, CA (US)

(72) Inventor: Justin Huang, Irvine, CA (US)

( * ) Notice: Subject to any disclaimer, the term of this patent is extended or adjusted under 35 U.S.C. 154(b) by 33 days.

(21) Appl. No.: 18/105,803

(22) Filed: Feb. 4, 2023

(65) Prior Publication Data
US 2023/0247977 A1    Aug. 10, 2023

Related U.S. Application Data

(60) Provisional application No. 63/306,952, filed on Feb. 4, 2022.

(51) Int. Cl.
*A01M 1/12* (2006.01)
*A01M 3/00* (2006.01)
*F16M 11/12* (2006.01)
*F16M 13/04* (2006.01)

(52) U.S. Cl.
CPC ............... *A01M 3/00* (2013.01); *A01M 1/12* (2013.01); *F16M 11/123* (2013.01); *F16M 13/04* (2013.01)

(58) Field of Classification Search
CPC .......... A01M 1/12; A01M 3/00; A01M 1/00; A01M 1/10; A01M 1/103; A01M 1/106; A01M 3/002; A01M 3/005; A01M 99/00; F16M 11/123
USPC ......... 43/107, 110, 111, 122, 133, 134, 135; 119/867
See application file for complete search history.

(56) References Cited

U.S. PATENT DOCUMENTS

| | | | | |
|---|---|---|---|---|
| 4,607,871 A * | 8/1986 | Kirkman | ................. | A47F 13/06 294/24 |
| 5,131,178 A * | 7/1992 | Stoliar | .................. | A01M 3/002 43/12 |
| 6,257,875 B1 * | 7/2001 | Johnstone | ............. | A01M 15/00 431/248 |
| 7,165,355 B2 * | 1/2007 | George | ................... | A01M 3/04 43/135 |

(Continued)

FOREIGN PATENT DOCUMENTS

CN         208597594 U  *  3/2019
GB           2337189 A  * 11/1999  .............. A01M 3/00

OTHER PUBLICATIONS

Translation of CN-208597594-U (Year: 2019).*

*Primary Examiner* — Darren W Ark
*Assistant Examiner* — William L Gmoser
(74) *Attorney, Agent, or Firm* — Garvey Adam LLP; Joshua A. Schaul

(57) ABSTRACT

A non-lethal insect trap, comprising a shaft connected to a two-axis gimbal, a transparent receptacle connected to the gimbal configured to surround an insect, a lid connected to the receptacle and means to rotatably cover and uncover the opening of the receptacle with the lid. Regarding the gimbal, a first axis is configured to automatically return the receptacle to an initial position while a second axis is configured to allow for manual adjustment without returning to an initial position. The trap further comprises a handle connected to the shaft, a cable internally routed through the shaft for connecting the handle with the lid and a spring connected to the lid and receptacle. The spring is configured to rotate the lid to the uncovered position when tension is released rotate the lid to the covered position when tension is applied to the cable.

5 Claims, 5 Drawing Sheets

(56) References Cited

U.S. PATENT DOCUMENTS

| | | | | |
|---|---|---|---|---|
| 7,631,910 | B2* | 12/2009 | Shalhoub | A01K 23/005 |
| | | | | 294/1.5 |
| 7,735,886 | B2* | 6/2010 | Tsukamoto | A01K 23/005 |
| | | | | 294/1.5 |
| 8,925,243 | B1* | 1/2015 | Vasquez | A01M 3/04 |
| | | | | 43/132.1 |
| 8,935,877 | B2* | 1/2015 | Gotschi | A01M 3/04 |
| | | | | 43/134 |
| 10,139,711 | B1* | 11/2018 | Wei | G03B 17/561 |
| 10,888,072 | B2* | 1/2021 | Bethea | A01K 69/08 |
| 2009/0044443 | A1* | 2/2009 | Flaherty | A01M 3/00 |
| | | | | 43/110 |
| 2019/0001494 | A1* | 1/2019 | Niemeyer | B25J 9/1638 |
| 2022/0174931 | A1* | 6/2022 | Caceres | A01M 3/00 |
| 2023/0362488 | A1* | 11/2023 | Yeh | F16M 11/041 |
| 2024/0117919 | A1* | 4/2024 | Li | F16M 11/18 |

* cited by examiner

500

502 — Moving a handle into a first position thereby rotating a lid about a pivot point which exposes an opening in a transparent receptacle

504 — Positioning the opening in the transparent receptacle using a two axis gimbal over an insect such that the insect resides temporarily inside the receptacle

506 — Moving the handle into a second position thereby rotating the lid about the pivot point which covers the opening in the transparent receptacle securing the insect temporarily inside the receptacle

508 — Removing the insect to a desired location

510 — Moving the handle into the first position thereby rotating the lid about the pivot point which exposes the opening in the transparent receptacle allowing the insect to leave the receptacle

FIG.5

REUSABLE NON-LETHAL INSECT TRAP

CROSS-REFERENCE TO RELATED APPLICATION

This patent application claims priority to U.S. Provisional Patent Application Ser. No. 63/306,952, filed Feb. 4, 2022, the disclosure of which is incorporated herein by reference in its entirety.

BACKGROUND

A variety of insect traps have been invented and employed, although most of these traps kill and often disfigure the insects. Most of these earlier insect traps, for example, employ some form of adhesive material to trap their quarry, and in so doing coat the insect body (or its parts) with said adhesive material thus ensuring the insect dies. There have been trap designs that do manage to capture some insect species without killing them. These traps generally use attractants such as pheromones or kairomones usually in combination with a type of mechanical funnel structure.

Unfortunately, such traps are of quite limited utility because relatively few insect species can be attracted by (known) pheromones or kairomones, and not all insect species exhibit the behavior necessary to make them susceptible to being trapped by a funnel-like device. Therefore, for most insect species, no traps have previously been available which can capture them alive and intact.

BRIEF SUMMARY

One or more embodiments relate to a non-lethal insect trap, comprising a shaft connected to a two-axis gimbal, a transparent receptacle connected to the gimbal configured to surround an insect, a lid connected to the receptacle and means to rotatably cover and uncover the opening of the receptacle with the lid. Regarding the gimbal, a first axis is configured to automatically return the receptacle to an initial position while a second axis is configured to allow for manual adjustment without returning to an initial position. The trap further comprises a handle connected to the shaft, a cable internally routed through the shaft for connecting the handle with the lid and a spring connected to the lid and receptacle. The spring is configured to rotate the lid to the uncovered position when tension is released from the cable and rotate the lid to the covered position when tension is applied to the cable.

These and other features, aspects and advantages of the embodiments will become understood with reference to the following description, appended claims and accompanying figures.

DESCRIPTION OF THE DRAWINGS

FIG. 5 illustrates a method for using the non-lethal insect trap, according to an embodiment.

DETAILED DESCRIPTION

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following description, numerous specific details are set forth, such as examples of specific percentages, components, etc., to provide a thorough understanding of the embodiments. It will be apparent, however, to one of ordinary skill in the art that the present design can be practiced without these specific details. In other instances, well known components or methods have not been described in detail but rather in a block diagram to avoid unnecessarily obscuring the present design. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
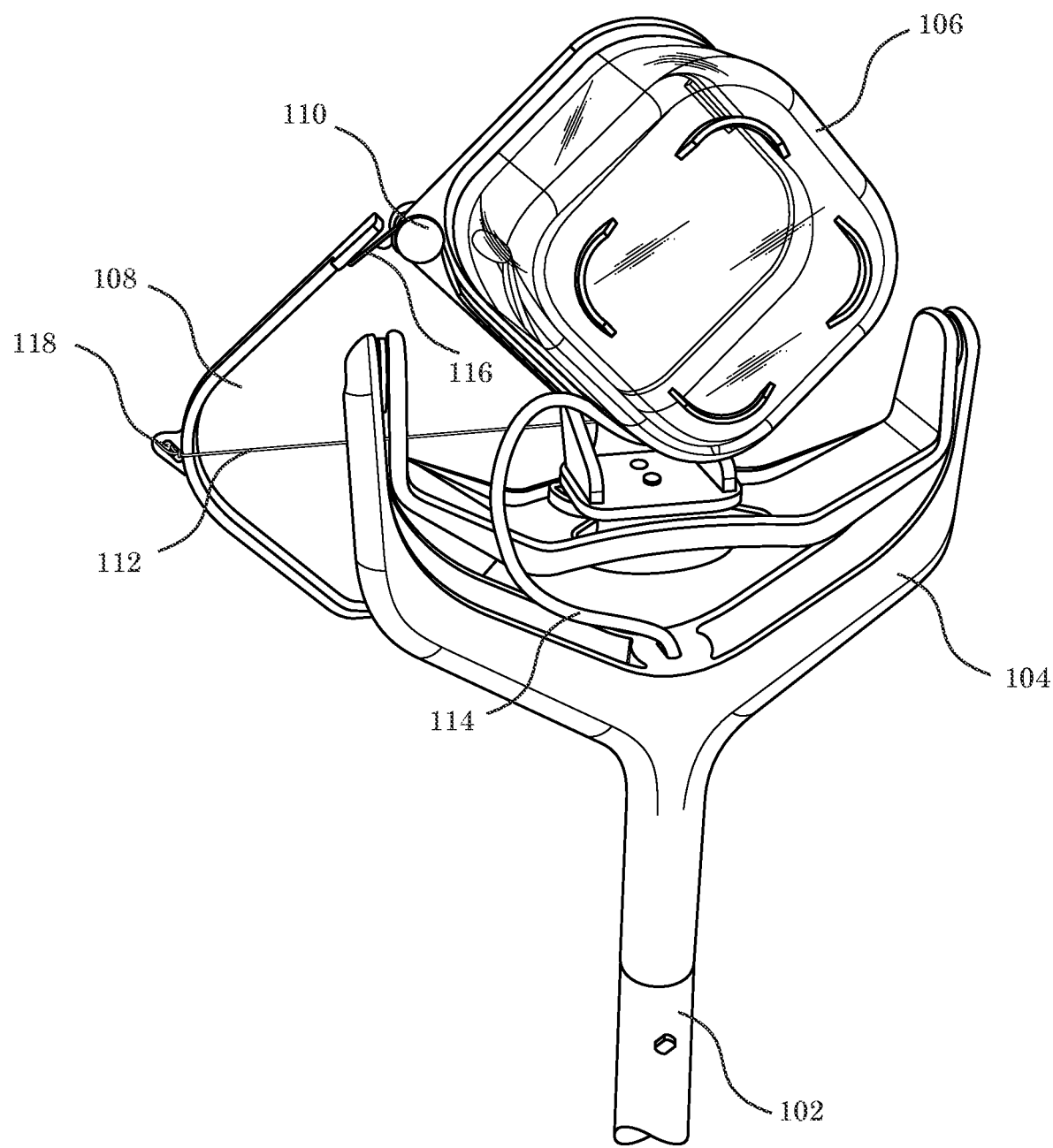
FIG. 1 illustrates a top view of the non-lethal insect trap in the open position, according to an embodiment.

Referring now to the drawings, FIG. 1 illustrates a top view of the non-lethal insect trap 100 in the open position, according to an embodiment. The trap 100 comprises a shaft 102 connected to a gimbal 104 with a receptacle 106 connected to the gimbal 104, The receptacle 106 is configured to surround an insect. The trap 100 further comprises a lid 108 connected to the receptacle 106 and configured to rotatably cover an opening of the receptacle, the rotation occurring about a pivot point 110 where the lid 108 and receptable 106 are connected.

In an embodiment, the gimbal 104 is a two-axis gimbal, a first axis configured to automatically return the receptacle 106 to an initial position in line with the gimbal itself. The second axis of the gimbal 104 is configured to allow for manual adjustment of the position of the receptacle 106 without returning to an initial position. In an embodiment, the first axis of the gimbal 104 is spring loaded while the second axis is friction fit designed for manual manipulation. In an embodiment of the present invention the receptacle (e.g., cup, net, bag) 106 is transparent. Although the figures details the receptacle 106 being square in shape, it is understood that alternative shapes for the receptacle 106 may be used, e.g., circular, oval, rectangle.

In one embodiment, the means to rotatably cover and uncover the receptacle 106 with the lid 108 further comprises a handle (322 FIG. 3) connected to the shaft 102 and a cable 112 connecting the handle with the lid at a point 118. In this configuration the cable 112 is internally routed in the shaft 102 of the trap 100 and passes through sheath 114 to avoid unnecessary wear on the cable 112. In one embodiment, a Teflon tube ensures a constant length constraint on the cable 112 so pulling the cable 112 does not change the tilt angle of the transparent insect receptacle 100.

In one embodiment the trap 100 further comprises a spring 116 connected to the lid 108 and receptacle 106 and configured to rotate the lid 108 about the pivot point 110 to the uncovered position when tension is released in the cable 112 and the spring 116 is unloaded. Similarly, the spring 116 is configured to load and rotate the lid 108 to the covered position when tension is applied to the cable 112.

Figure 2:
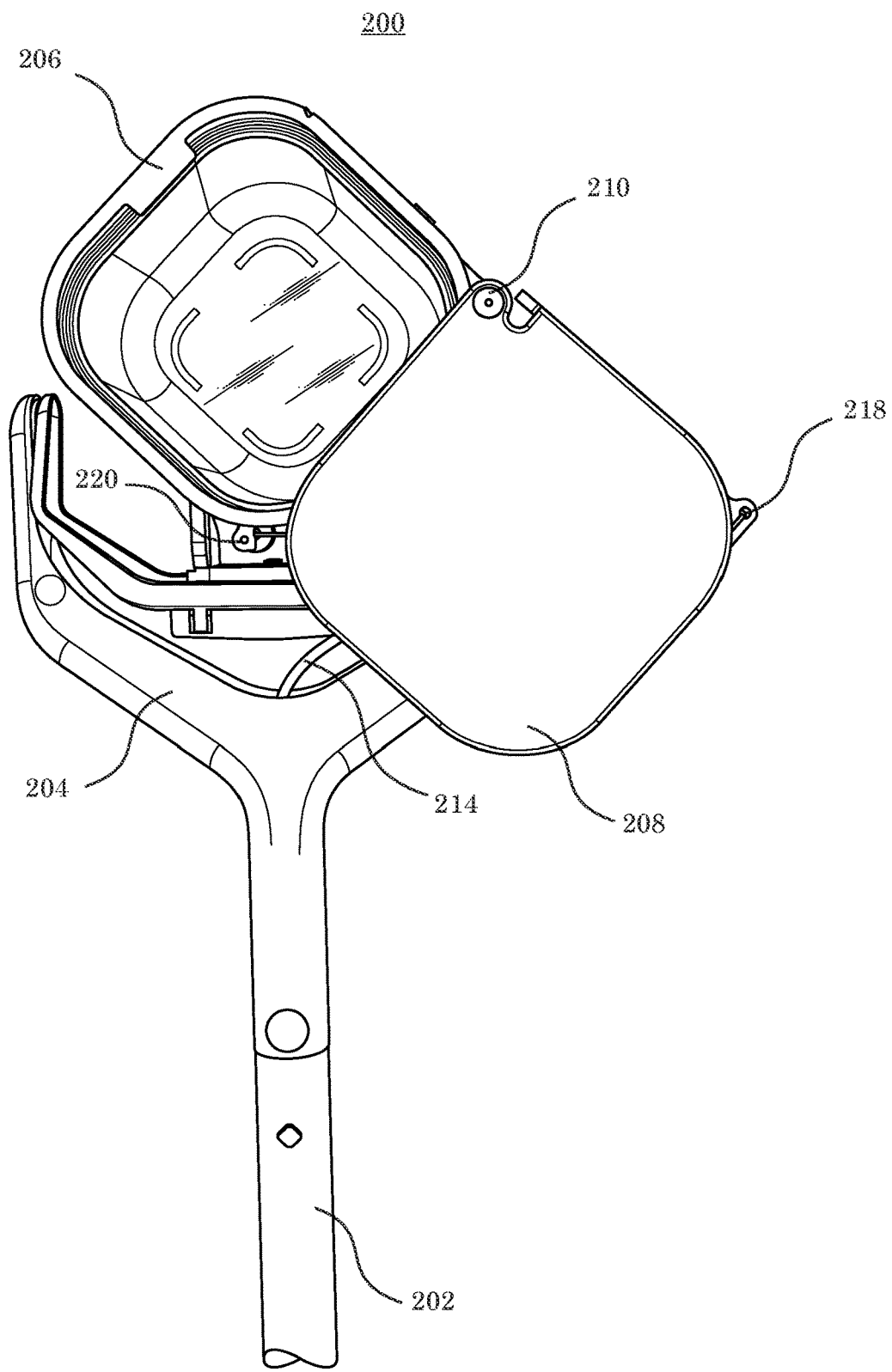
FIG. 2 illustrates a bottom view of the non-lethal insect trap in the open position, according to an embodiment.

FIG. 2 illustrates a bottom view of the non-lethal insect trap 200 in the open position, according to an embodiment. In this figure the trap 200 comprises a shaft 202 connected to a two-axis gimbal with a transparent receptacle 206 connected to the gimbal 204 and configured to surround an insect. The lid 208 is connected to the receptacle 206 via a cable connected at point 218. Said cable routes through junction 220 which interfaces with a sheath (114 FIG. 1) for internal routing of the cable. In this embodiment, the lid 208 is rotated about pivot 210 such that the opening in the transparent receptacle 206 is not obscured and the trap 100 may be used to surround an insect.

Figure 3:
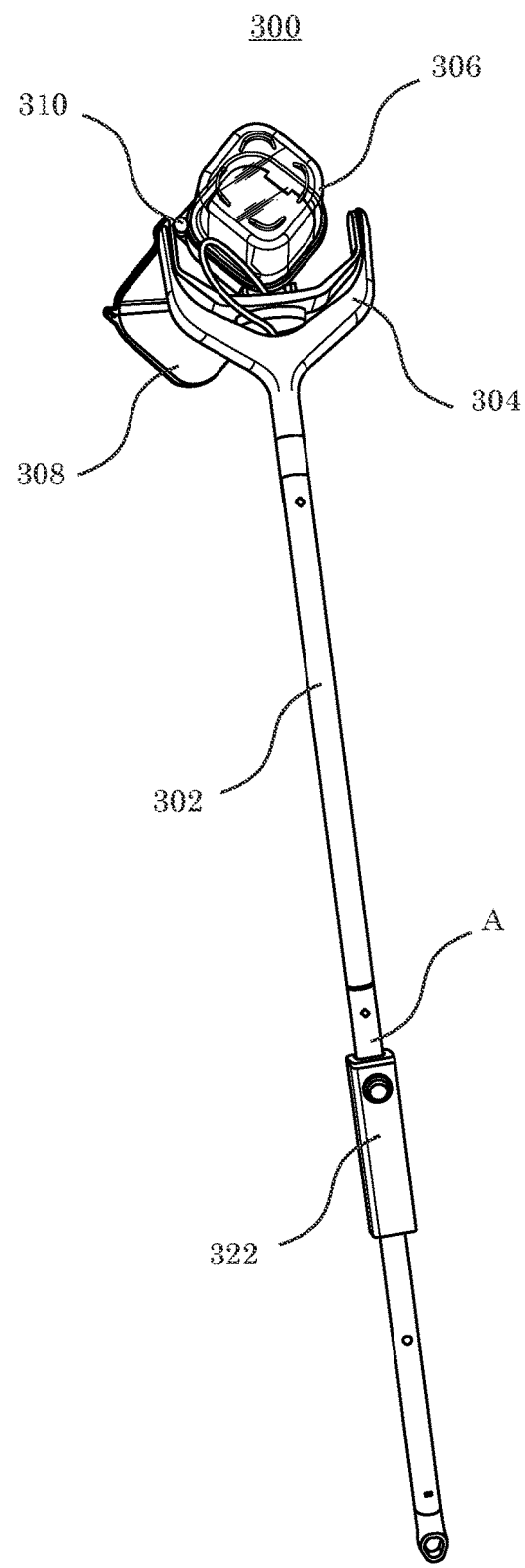
FIG. 3 illustrates an alternative view of the non-lethal insect trap in the open position, according to an embodiment.

FIG. 3 illustrates an alternative view of the non-lethal insect trap 300 in the open position, according to an embodiment. In this configuration handle 322 is connected to shaft 302 which is in turn connected to gimbal 304. The gimbal is connected to the receptacle 306 which is connected at pivot point 310 with the lid 308. When the handle 322 is moved to the opening position A, tension in the internally routed cable (112 FIG. 1) is released allowing the spring (116 FIG. 1) to unload thereby rotating the lid 308 into the open position exposing the internal surface of the transparent receptacle 306.

Figure 4:
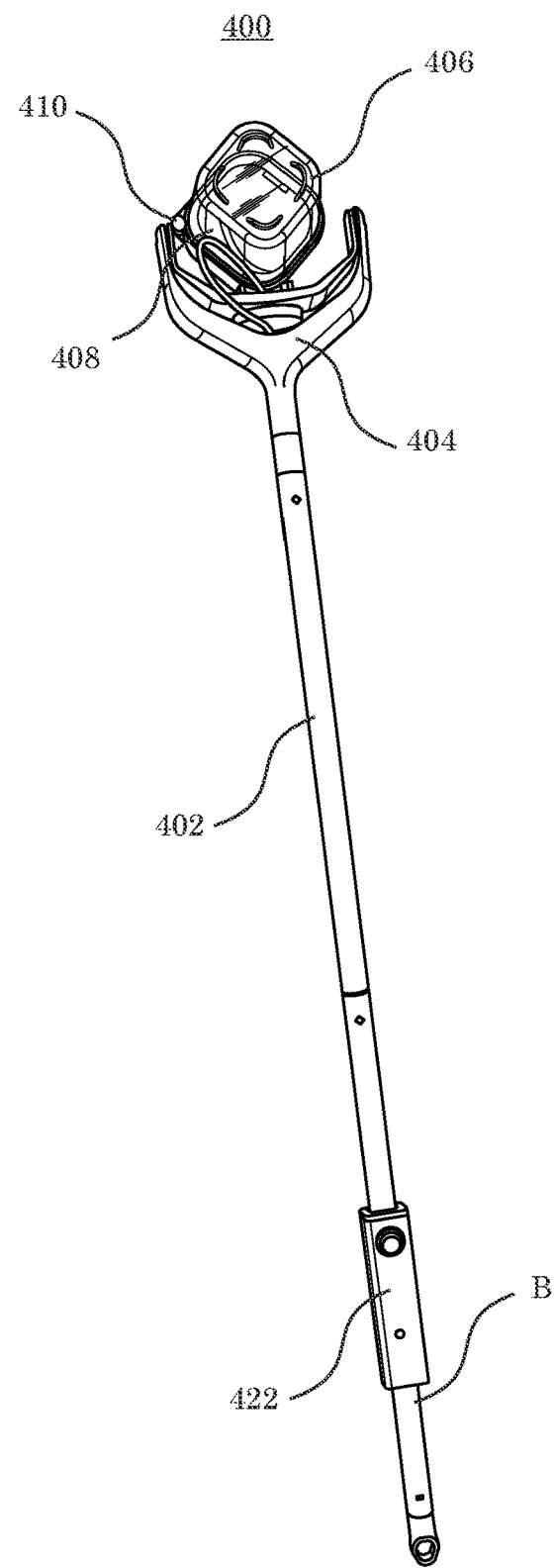
FIG. 4 illustrates an alternative view of the non-lethal insect trap in the closed position, according to an embodiment.

FIG. 4 illustrates an alternative view of the non-lethal insect trap 400 in the closed position, according to an embodiment. In this configuration handle 422 is connected to shaft 402 which is in turn connected to gimbal 404. The gimbal 404 is connected to the receptacle 406 which is connected at pivot point 410 with the lid 408. When the handle 422 is moved to the closing position B, tension in the internally routed cable (112 FIG. 1) is applied which overcomes the spring (116 FIG. 1) to force the lid 408 to cover the internal surface of the transparent receptacle 406. In an embodiment, the handle 422 is slidably movable from position A to position B.

FIG. 5 illustrates a method 500 for using the non-lethal insect trap, according to an embodiment of the present invention. The method 500 begins at step 502 moving a handle (322 FIG. 3) into a first position (A FIG. 3) thereby rotating a lid (308 FIG. 3) about pivot point (310 FIG. 3) and opening the transparent receptacle (306 FIG. 3) to receive an insect. After step 502 the method 500 continued to step 504 positioning the opening of the transparent receptacle (306 FIG. 3), using a two axis gimbal (304 FIG. 3) over an insect such that the insect resides inside the receptacle.

After step 504 method 500 continues with step 506 moving the handle (422 FIG. 4) into a second position (B FIG. 4) thereby rotating the lid (408 FIG. 4) about the pivot point (410 FIG. 4) and closing the transparent receptacle (406 FIG. 4) with the lid (408 FIG. 4). At this step the insect is safely temporarily inside the receptacle (406 FIG. 4). After step 506 the method 500 continues with step 508 which is simply moving the trapped insect to a different location.

After step 508 the method 500 finishes with step 510 moving the handle (322 FIG. 3) back to the first position (A FIG. 3) thereby moving the lid (308 FIG. 3) away from the receptacle (306 FIG. 3) allowing the insect to leave the receptacle.

The descriptions of the various embodiments have been presented for purposes of illustration but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A non-lethal insect trap, comprising:
   a shaft connected to a gimbal;
   a receptacle connected to the gimbal and configured to surround an insect;
   a lid connected to the receptacle and configured to rotatably cover an opening of the receptacle;
   wherein a first axis of the gimbal is configured to automatically return the receptacle to an initial position; and
   wherein a second axis of the gimbal is configured to allow for manual adjustment without returning to an initial position.

2. The non-lethal insect trap of claim 1, wherein the first axis is spring loaded; and wherein the second axis is friction fit.

3. The non-lethal insect trap of claim 1, wherein the receptacle is transparent.

4. A non-lethal insect trap, comprising:
   a shaft connected to a two-axis gimbal;
   a transparent receptacle connected to the gimbal and configured to surround an insect;
   a lid connected to the receptacle and configured to rotatably cover an opening of the receptacle; and
   a means to rotatably cover and uncover the opening of the receptacle with the lid;
   wherein a first axis of the gimbal is configured to automatically return the receptacle to an initial position;
   wherein a second axis of the gimbal is configured to allow for manual adjustment without returning to an initial position; wherein the first axis is spring loaded; and wherein the second axis is friction fit.

5. The non-lethal insect trap of claim 4, the means to rotatably cover and uncover the receptacle with the lid further comprising:
   a handle connected to the shaft;
   a cable connecting the handle with the lid; and
   a spring connected to the lid and receptacle;

wherein the cable is internally routed through the shaft;
wherein the spring is configured to rotate the lid to the uncovered position when tension is released in the cable and further configured to rotate the lid to the covered position when tension is applied to the cable.

\* \* \* \* \*